United States Patent Office 2,954,096
Patented Sept. 27, 1960

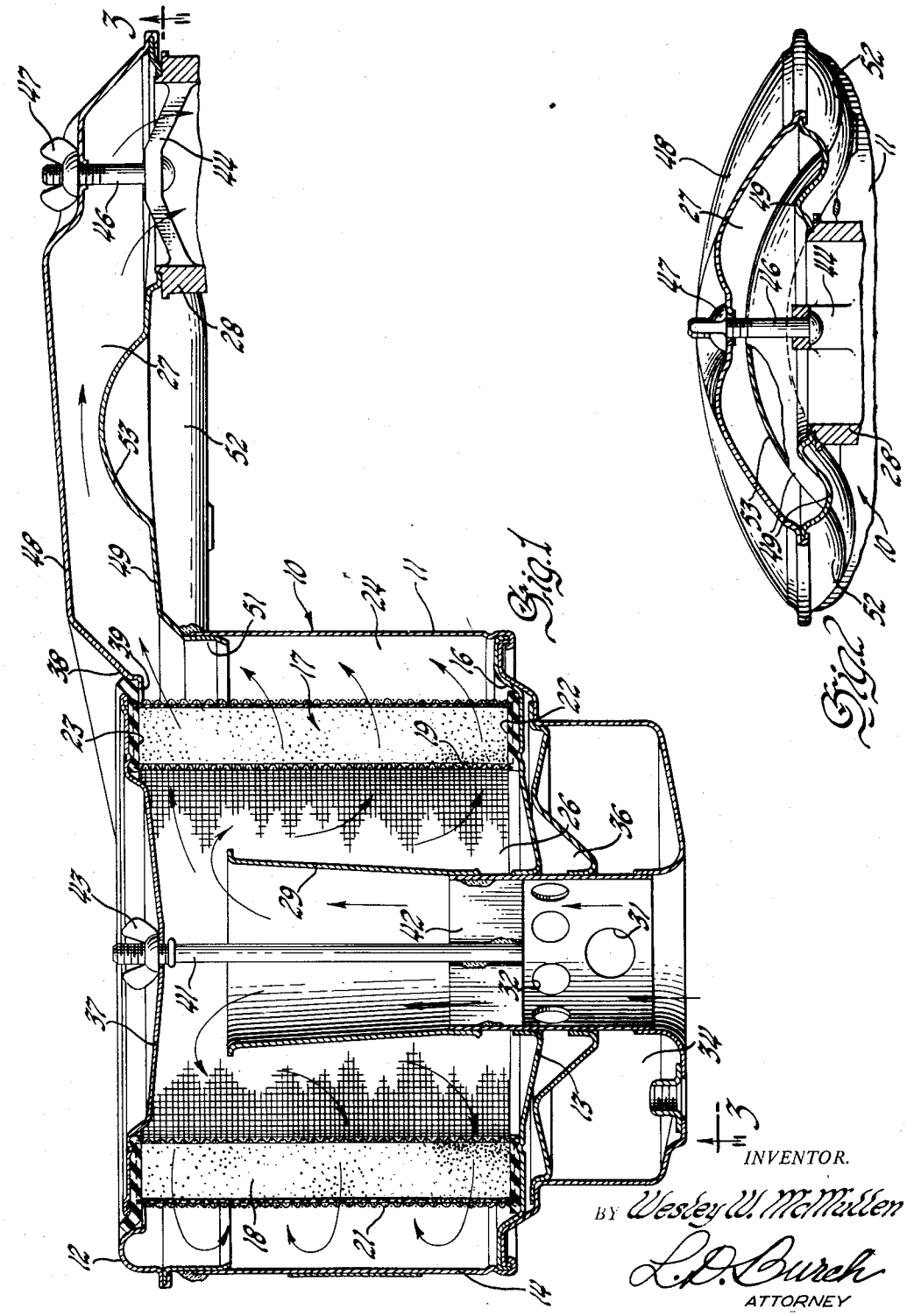

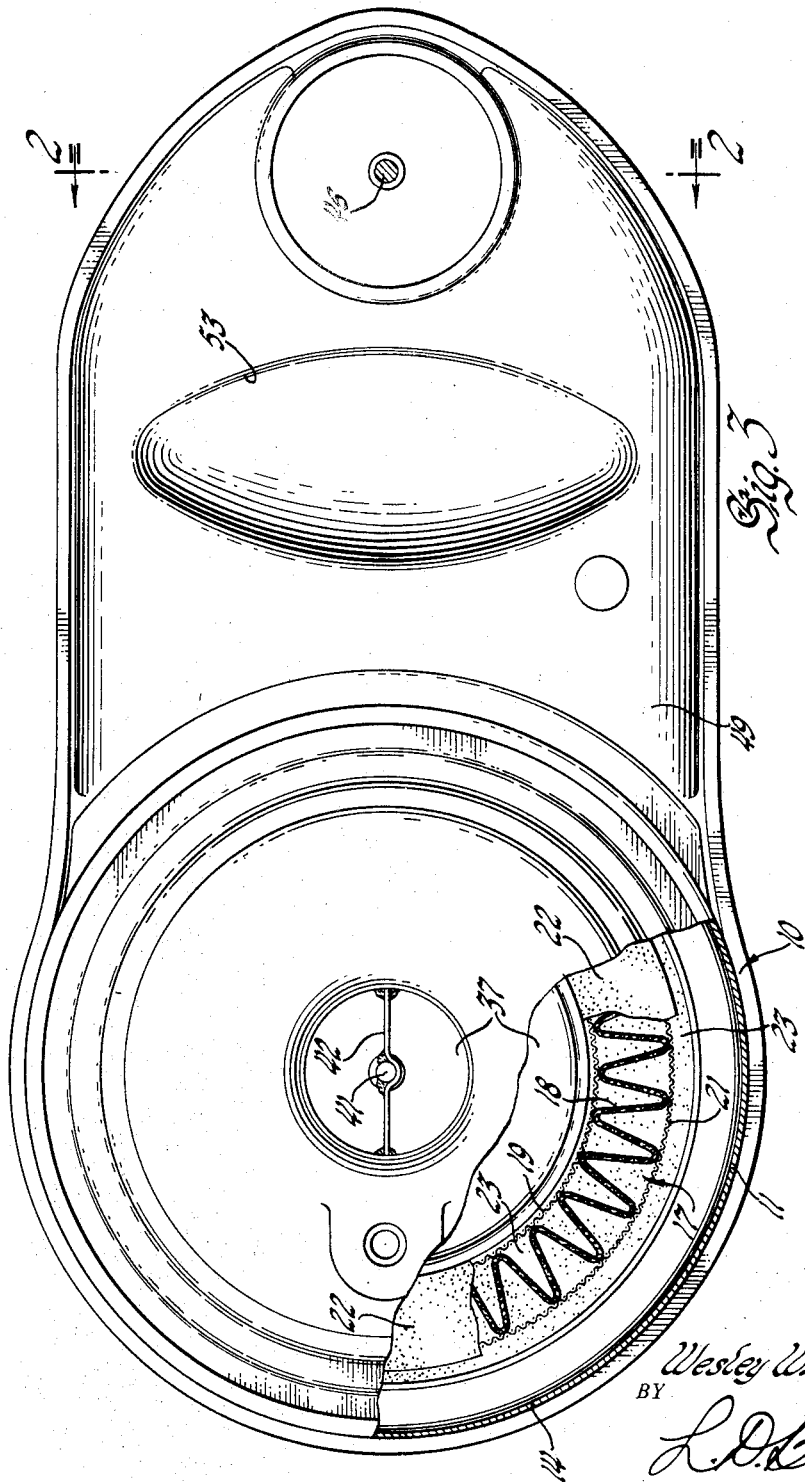

2,954,096
AIR CLEANER SILENCER ASSEMBLY

Wesley W. McMullen, Flint, Mich., assignor to General Motors Corporation, Detroit, Mich., a corporation of Delaware Filed Sept. 6, 1957, Ser. No. 682,507

2 Claims. (Cl. 183—73)

This invention relates to cleaner silencer assemblies for use with internal combustion engines and the like.

In order to conserve space it is proposed to construct a cleaner unit with air inlet therefor disposed internally of a cylindrical filter element with which the unit is provided. Under such circumstances the dirt separated from the air will collect on the inside of the filter element and the clean air will be collected in a chamber surrounding the filter element. It is proposed to tune the unit to attenuate sounds emanating from the induction system of the engine with which the unit is employed. To do this it is proposed to project a tuning tube axially inwardly of the filter element, the tube being also employed for supplying air to the filter element. The filter chamber and the outlet leading therefrom to the induction system of the engine then may be employed as an acoustical expansion chamber to be tuned with the tuning tube to attenuate the sounds emanating from the induction system of the engine. It is also proposed to provide resonating chamber means surrounding the air inlet for the tuning tube and acoustically coupled to the tuning tube inlet so that the resonating chambers also may be tuned to attenuate sounds emanating from the engine.

In the drawings,

Figure 1 is a vertical sectional view through a cleaner silencer assembly embodying the principles of the invention;

Figure 2 is a cross-sectional view of the air outlet leading from the assembly and illustrating the reinforced construction of the outlet, and taken on line 2—2 of Figure 3, Figure 3 is a bottom plan view of the structure disclosed by Figure 1 with a part of the structure broken away to show the internal construction of the assembly.

The cleaner silencer assembly 10 embraces a casing 11 having oppositely disposed end walls 12 and 13, and a side wall 14. The end wall 13 is constructed to provide a depressed annular shoulder 16 for centrally locating the inner end of an annular filter element indicated at 17. The filter element 17 may be of any desired form although in the present instance it comprises an accordion pleated paper element 18 located between a pair of screen wall elements 19 and 21 all imbedded in plastic end plates 22 and 23.

The filter element 17 is positioned in the casing 11 in spaced relation to the side wall 14 to provide an outer air outlet chamber indicated at 24. The space within the filter provides an inner air inlet chamber 26. The two chambers and the space within the filter 17 form an acoustical expansion chamber 24, 26. The casing 11 also is formed ot provide laterally extending air outlet and acoustical inlet passage means indicated at 27 and adapted to be connected to the induction system of an engine indicated at 28. Air is supplied to the air supply chamber 26 within the filter 17 by a conduit 29 which projects through the end walls 13 axially with respect to the filter element 17 and terminates within the chamber 26 adjacent the end wall 12 but sufficiently spaced therefrom to distribute the air supplied to the chamber around the end of the conduit 29. The outer end of the conduit 29 is acoustically coupled at 31 and 32 to resonating chamber means 34 and 36 which are formed in the casing 11 around the outer end of the conduit 29. The conduit 29 also provides an acoustical impedance tube which may be tuned to the acoustical expansion chamber means 24, 26 and to the acoustical inlet passage means 27 to attenuate sounds emanating from the induction system 28 of the engine with which the assembly may be employed. The acoustically coupled resonating chamber means 34, 36 also may be tuned to the sounds emanating from the induction system 28 of the engine.

In order to be able to replace the filter element 17 when necessary, it is proposed to provide a cover or closure 37 in the end wall 12. The outer edge of cover 37 is adapted to engage the upper end plate 23 of the filter element 17 and to compress the outer edge of the end plate against a circular shoulder 38 formed in the end wall 12 around the opening 39 through which the filter 17 may be projected into the interior of the casing 11. The closure 37 is held in place by a bolt 41 secured in a bridge 42 in the inlet conduit 29. A wing nut 43 removably secures the cover 37 to the bolt 41.

The induction system inlet 28 also may be provided with a bridge 44 through which bolt 46 may project. The bolt 46 also extends through an opening in the outlet passage means 27 and is there removably secured by a wing nut 47 which holds the casing 11 upon the induction system inlet 28.

In order to reinforce the casing 11 so that the weight of the structure may be suspended from the induction system inlet 28 without objectionable vibration, it is proposed to construct the upper part of the casing 11 by employing a pair of stampings indicated at 48 and 49. As may be seen from Figure 3 these stampings are elongated to extend between the part of the casing containing the filter 17 and the induction system inlet 28 and are approximately of uniform width. The induction system inlet 28 does not require this width but there is an advantage in enlarging the acoustical expansion space within the casing and the width of the stampings at the outlet end of the casing is therefore employed for this purpose. It is apparent however that the excessive width of the stampings at the outlet end would tend to cause the casing to vibrate which would result in objectionable noise and the structure would not form a firm and rigid support. It is therefore proposed to form the outlet end of the casing as is indicated in Figure 2 and by curving the upper stamping 48 upwardly and outwardly around the cover 37 and between the cover 37 and the induction system inlet 28. The lower wall 49 is flanged at 51 to extend into the side wall 14 and is curved downwardly at the edges as is indicated at 52 and upwardly at the middle as is indicated by 53. This construction provides a rigid truss structure between the part of the casing containing the filter 17 and the part thereof connected to the induction system of the engine and makes possible the support of the structure upon the induction system inlet without excessive noise and rigidity.

I claim:

1. A cleaner silencer assembly comprising a casing having spaced end walls and a side wall, annular filter means disposed between said walls and having ends engaging said end walls and being spaced inwardly of said side wall and providing an inner air inlet chamber inwardly of said filter means and an outer air outlet chamber outwardly of said filter means, said inlet and outlet chambers also forming acoustical expansion chamber means for said assembly, said casing also being formed to provide air outlet and acoustical inlet passage means communicating with said outlet chamber for connecting said cleaner silencer assembly to the induction system of an internal combustion engine, and air inlet and acoustical impedance passage means having an outer end opening directly into the atmosphere and an inner end extending through one of said end walls of said casing and into and communicating with said inlet chamber and supplying air to said inlet chamber inwardly of said filter means, said air inlet and acoustical impedance passage means and said acoustical expansion chamber means and said acoustical inlet passage means being tuned to attenuate sounds emanating from said induction system of said engine, said air inlet and impedance passage means being an elongated conduit forming a substantially uniform and continuous passage between said inlet chamber and the atmosphere, said passage being as large at the inlet chamber end as at the atmosphere end of said passage.

2. A cleaner silencer assembly comprising a casing having spaced end walls and a side wall, annular filter means disposed between said walls and having ends engaging said end walls and being spaced inwardly of said side wall and providing an inner air inlet chamber inwardly of said filter means and an outer air outlet chamber outwardly of said filter means, said inlet and outlet chambers also forming acoustical expansion chamber means for said assembly, said casing also being formed to provide air outlet and acoustical inlet passage means communicating with said outlet chamber for connecting said cleaner silencer assembly to the induction system of an internal combustion engine, and air inlet and acoustical impedance passage means having an outer end opening directly into the atmosphere and an inner end extending through one of said end walls of said casing and into and communicating with said inlet chamber and supplying air to said inlet chamber inwardly of said filter means, said air inlet and acoustical impedance passage means and said acoustical expansion chamber means and said acoustical inlet passage means being tuned to attenuate sounds emanating from said induction system of said engine, said air inlet and impedance passage means being an elongated conduit forming a substantially uniform and continuous passage between said inlet chamber and the atmosphere, said passage being as large at the inlet chamber end as at the atmosphere end of said passage, said casing also being formed to provide annular resonating chamber means surrounding and acoustically coupled to said air inlet and acoustical impedance passage means outwardly of said one of said end walls, said acoustically coupled resonating chamber means also being tuned to attenuate sounds emanating from said induction system of said engine.

References Cited in the file of this patent

UNITED STATES PATENTS

| | | |
|---|---|---|
| 2,214,731 | Kamrath | Sept. 17, 1940 |
| 2,632,526 | Brock | Mar. 24, 1953 |
| 2,705,546 | Chaffey | Apr. 5, 1955 |
| 2,783,857 | McMullen | Mar. 5, 1957 |
| 2,789,662 | McMullen | Apr. 23, 1957 |